United States Patent [19]

Kuijk

[11] 4,122,505
[45] Oct. 24, 1978

[54] MAGNETO-RESISTIVE READING HEAD WITH SUPPRESSION OF THERMAL NOISE

[75] Inventor: Karel Elbert Kuijk, Eindhoven, Netherlands

[73] Assignee: U.S. Philips Corporation, New York, N.Y.

[21] Appl. No.: 840,760

[22] Filed: Oct. 11, 1977

[30] Foreign Application Priority Data

Oct. 19, 1976 [NL] Netherlands .......................... 7611522

[51] Int. Cl.² .............................................. G11B 5/30
[52] U.S. Cl. ................................. 360/113; 338/32 R; 324/252
[58] Field of Search .......................... 360/113; 324/46; 338/32 R

[56] References Cited

U.S. PATENT DOCUMENTS 3,848,217   11/1974   Lazzari ................................... 360/113
4,040,113   8/1977    Gorter .................................... 360/113
4,052,748   10/1977   Kuijk ..................................... 360/113

FOREIGN PATENT DOCUMENTS 2,308,158   4/1976   France ...................................... 360/113

OTHER PUBLICATIONS

IBM Technical Discl. Bulletin, vol. 20, No. 2, Jul. 1977, pp. 791-793, "Barberpole MR Head".

Primary Examiner—John H. Wolff
Attorney, Agent, or Firm—Frank R. Trifari; Robert S. Smith

[57] ABSTRACT

A magnetic reading head having a magneto-resistive element of the type in which the measuring current is forced to flow through the element at an angle with the easy axis of magnetization. For suppressing thermal noise (resistance variations under the influence of temperature fluctuations as a result of the contact of the element with a moving record carrier), the element is subjected to an auxiliary field parallel to the easy axis of magnetization, the direction of which is reversed at a frequency $f_s$. The measuring current alternates at the same frequency in phase with the reversals of the auxiliary field. The output signal of the element is applied through a low-pass filter which cuts off signals of a frequency $f_s$ to a detection device.

4 Claims, 3 Drawing Figures

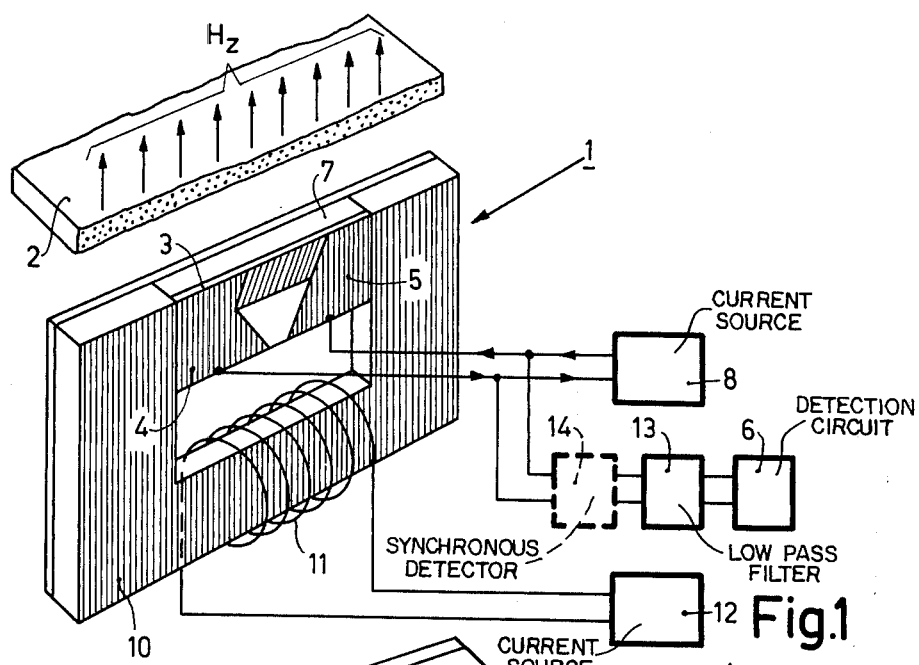
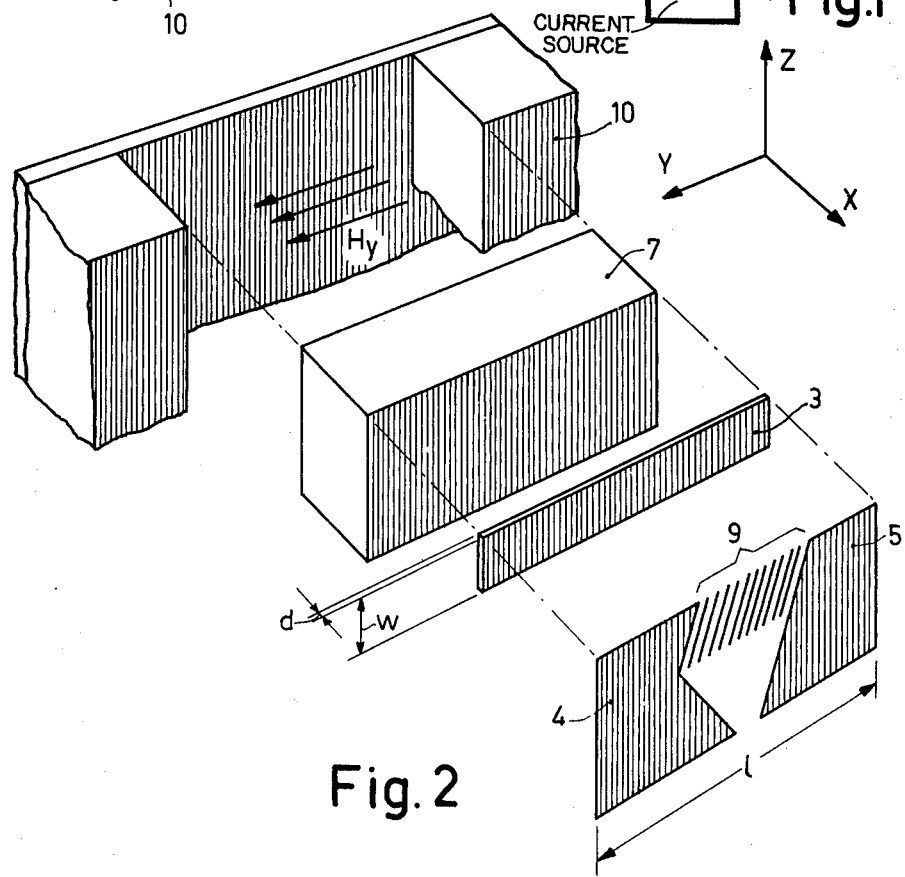

MAGNETO-RESISTIVE READING HEAD WITH SUPPRESSION OF THERMAL NOISE

The invention relates to a magnetic reading head for detecting information-representing magnetic signal fields on a magnetic recording medium, the head comprising a magneto-resistive element of metallic, ferromagnetic material which is supported on a substrate, which has an easy axis of magnetization in the plane of the element, and which is provided with electrical contacts for enabling it to be connected to a source of measuring current, bias means which force the measuring current to flow through the element at an angle of at least 35° and at most 55° with the easy axis of magnetization, and a magnetic device for subjecting the element to a magnetic auxiliary field which is parallel to the easy axis of magnetization.

A head of the above-mentioned kind is described in "The Barberpole, a linear magneto-resistive head" in IEEE Transactions on Magnetics, September 1975, Vol. MAG 11, No. 5, pp, 1215–1217.

This paper describes a head using a strip-shaped element of a ferromagnetic, metallic material having low anisotropy, for example Ni-Fe, which is held with one of its edges in contact with a magnetic recording medium. The field on the recording medium produce variations in the magnetization of the element when the medium is moved across the head and modulate the resistance thereof via the magneto-resistance effect. Thus, when the recording medium passes the head, the fields rotate the spin system of the magneto-resistive element, so that the electrical resistance of the element varies. When a detection circuit is connected to the element then an output signal of this circuit can be a function of the information stored in the recording medium.

Since the variation in the resistance of a magneto-resistive element under the influence of a magnetic field is quadratic, it is usual in reproducing analogically recorded signals to optimize the operation of the head by linearization of the resistance magnetic field characteristic. For this purpose, the direction of current flow through the element should make an angle of approximately 45° with the direction of magnetization of the element in the presence of a signal field of zero field strength.

With the head of the paper this is achieved by making the easy axis of magnetization lie parallel to the largest dimension of the element and providing bias means which force the current to flow through the element at an angle of approximately 45° with the longitudinal direction. Several, alternative methods are known for controlling the desired angle between the direction of current and the direction of magnetization in the presence of a signal field of zero, field strength all of which methods have in common that the direction of current flow is adjusted instead of the magnetization direction: the bias means used are non-magnetic bias means.

The head of the paper furthermore comprises a magnetic device for producing a magnetic auxiliary field in a direction parallel to the easy axis of magnetization. The auxiliary field which has a strength corresponding to the coercive field strength of the element material is directed along one of the two opposite directions in which the magnetization Vector may orient itself. The auxiliary field ensures that one direction is favoured more than the other so that a reversal from one direction to the other, which would result in a variation of the resistance of the element, is prevented.

It is known that magneto-resistive heads in general, are affected by "thermal noise", that is by the presence of interference peaks in the output signal. These peaks are produced by temperature fluctuations as a result of frictional contact of the head with the surface of the recording medium which is being read out.

It is an object of the invention to provide a magnetic reading head of the kind mentioned in the preamble which has a reduced sensitivity to temperature fluctuations.

For that purpose the reading head according to the invention is characterized in that means are present to reverse the auxiliary field direction at a frequency $f_s$ which is at least twice the highest expected signal field frequency, that the measuring current alternates at frequency $f_s$ in phase with the reversals of the auxiliary field, and that the electrical contacts of the element are connected through a low-pass filter which cuts off the signals of a frequency $f_s$ to a detection device.

The invention is based on the observation that in magneto-resistive heads of the non-magnetically biased type upon inversing the polarity of the auxiliary field the resistance variation which the element experiences under the influence of an energization flux, changes sign while the resistance variation under the influence of temperature fluctuations by friction with the recording medium does not change sign. By taking a measuring current which inverts sign at the same frequency as the inversion of the polarity occurs, and which is also in phase therewith, an output signal is obtained which contains both frequency variable and frequency invariable components. The signal component which is a result of resistance variations by temperature fluctuations varies with the frequency $f_s$, while the signal component which is a result of resistance variations under the influence of the energization flux of a recording medium does not vary with the frequency $f_s$. By using a low-pass filter, only the last mentioned component can be measured.

Within the scope of the invention it is possible alternatively to use a unidirectional current as a measuring current and possibly after an amplification stage to switch the alternating voltage signal of the element in a synchronous detector with a frequency $f_s$ before it is passed through the low-pass filter.

An alternative embodiment of the magnetic reading head according to the invention is characterized in that means are present to reverse the auxiliary field direction at a frequency $f_s$ which is at least twice the highest expected signal field frequency, that the measuring current is a constant unidirectional current, that the electrical contacts of the element are connected through a reversing switch operated at a frequency $f_s$, and a low-pass filter which cut-off signals of a frequency $f_s$ to a detection device.

As already noted above, several alternative means are known to non-magnetically bias a magneto-resistive element. It is possible, for example, with a given orientation of the easy axis of magnetization (for example, parallel to the largest dimension of the element), to produce the desired angle between direction of current and easy axis of magnetization by providing slots in the element which extend at a given angle with respect to the easy axis of magnetization and open alternately into one long side and into the other long side of the element.

Within the scope of the invention, however, it has been found to be very practical in a magneto-resistive element whose easy axis of magnetization is parallel to the largest dimension to provide a number of mutually parallel equipotential strips of electrically conductive material on a major surface of the magneto-resistive element at an angle of at least 35° and at most 55° with the largest dimension thereof between the contacts. The advantage hereof is that in applications in which the magneto-resistive element is in contact with the recording medium, the improved operation need not be lost in the event of same surface wear of the element, which would be likely in a construction having slots. In addition, the magnetic continuity of a magneto-resistive element is not interrupted when equipotential strips are provided on it. In a construction having slots on the contrary the magnetic continuity may possibly become damaged when surface wear occurs.

The invention will be described in greater detail, by way of example, with reference to the accompanying drawings, but is not restricted to this embodiment.

In the drawings:

FIG. 1 is a simplified perspective view of a magneto-resistive reading head according to the invention with the associated circuits in block form, FIG. 2 shows the individual elements of FIG. 1 on an enlarged scale.

Figure 3:
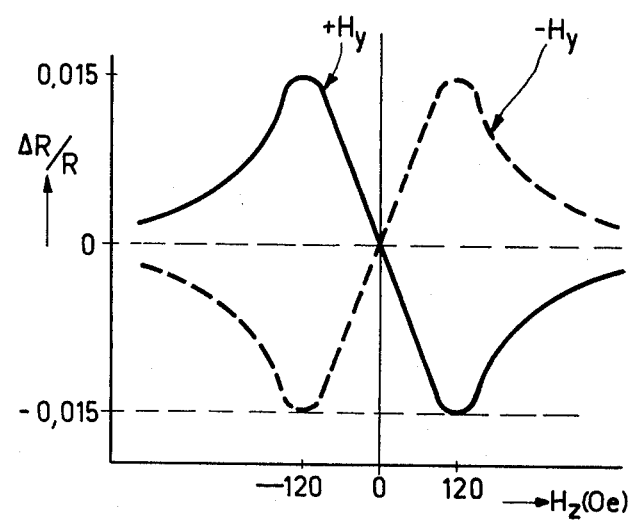
FIG. 3 is a graph showing the resistance variation $\Delta R/R$ of the magneto-resistive element 3 of the head 1 of FIG. 1 as a function of a transversal signal field $H_z$ upon applying an auxiliary field $H_y$ in two opposite directions.

FIG. 1 shows a magneto-resistive head 1 which is depicted in use for reading the information content of a magnetic recording medium 2. The head 1 comprises a magneto-resistive element 3 which is connected to an external readout circuit 6 via electrically conductive contacts 4 and 5. The element 3, and the contacts 4 and 5 are formed on a substrate 7, which may be glass, by means of thin-film methods. In this embodiment the element 3 was a thin layer of an Ni-Fe alloy having a thickness d of approximately 0.1 micron, a length l of 100 microns and a height W of 10 microns. The contacts 4 and 5 were formed by vapour-deposited gold strips. A number of thin gold strips 9, thickness 1 micron, width 2 microns, are provided on the element 3 at mutual distances of 2.5 microns at an angle of 45°. The gold has a 5 times lower resistivity than the Ni-Fe alloy used and the thickness of the gold strips is approximately 10 times as large as the thickness d of the magneto-resistive element. Therefore the gold strips conduct 50 times better and serve as "equipotential strips" which force the current in the Ni-Fe alloy path between them to flow at an angle of approximately 45° with the longitudinal direction. When the head is brought into a flux coupling arrangement with an information-containing magnetic field, the resistance of each of the Ni-Fe alloy paths situated between the equipotential strips 9 will decrease or increase, dependent on the fact whether the magnetization direction under the influence of the field coincides more or less with the current direction. In this manner, magnetic recordings can be reproduced with low distortion by means of a nonmagnetically biased magneto-resistive head.

An auxiliary field $H_y$ is generated by means of a magnet core 10. For that purpose, a magnetic flux is generated in the magnet core 10 by means of a winding 11 which is energized by a current source 12.

It is known of magneto-resistive heads that they are troubled by "thermal" noise, that is interference peaks in the resistance values as a result of friction with a recording medium. A method of suppressing said peaks is as follows. The polarity of the auxiliary field $H_y$ is continuously reversed with a comparatively high switching frequency. For audio applications in which the signals in the field $H_z$ occur up to a maximum of 20 kHz, said switching frequency $f_s$ should not be lower than 40 kHz. When the graph shown in FIG. 3 is considered, which shows the resistance variations $\Delta R/R$ of the element 3 of FIG. 1 as a function of the signal field $H_z$, this means that upon reversing the direction of the auxiliary field from $+H_y$ to $-H_y$ and conversely, a transition always occurs from one static curve to the mirrored curve which is expressed in the equation:

$$R = R_o \pm \Delta R (H_z), \qquad (1)$$

in which the positive and negative signs alternate with one other at the frequency $f_s$.

In the linear range it holds that:

$$\Delta R (H_z) = 1.4 \Delta R_{max} H_z \qquad (2)$$

An extra interference $\delta R$ occurs as a result of friction with the surface of the recording medium the sign of which is independent of $H_y$, so:

$$R = R_o \pm \Delta R \{H_z(t)\} + \delta R (t) \qquad (3)$$

By causing the current source 8 to supply a measuring current which alternates at the frequency $f_s$, and also in phase therewith, a voltage occurs across the contacts 4 and 5.

$$V = \pm IR = \pm IR_o + I \Delta R \{H_z(t)\} \pm I \delta R (t) \qquad (4)$$

By using a low-pass filter 13 of the correct proportioning, all voltage components which vary with the switching frequency $f_s$ can be stopped. Only the component $\Delta R \{H_z(t)\}$ is passed to the detection circuit 6 and thus provides the information to be measured. The "thermal" noise has been suppressed.

In an alternative embodiment, first the alternating voltage signal which is obtained upon measuring with a constant unindirectional current $$\vartheta (t) = \pm I \Delta R \{H_z(t)\} + I \delta R (t)$$

may be amplified, after which the said signal is repeatedly reversed in polarity at the frequency $f_s$ in a synchronous detector 14.

A signal corresponding to the expression:

$$\pm A \vartheta(t) = A [I \Delta R \{H_z(t)\} \pm I \delta R (t)] \qquad (5)$$

where $A$ is the amplification factor is then obtained. By means of a low-pass filter 13 again the signal may be treated so that only the component $AI. \Delta R \{H_z(t)\}$ remains.

In practice the auxiliary field can have a field strength which may lie between 1 and 5 Oersteds, but this strength is not a very critical value. It should be of the order of the coercive field strength of the material of the magneto-resistive element 3.

What is claimed is:

1. A magnetoresistive transducer head with thermal noise suppression comprising: a generally planar thin film magnetoresistive element having an easy axis of magnetization in a major plane of said element; a source of alternating measuring current having means for connecting said source at least indirectly to said element; bias means which induce the measuring current to flow through said element at an angle of at least 35° and at most 55° with said easy axis of magnetization; means to produce a magnetic field the direction of which is parallel to said easy axis of magnetization; means for reversing the polarity of said magnetic field at a frequency $f_s$; means for reversing the polarity of the measuring current at a frequency $f_s$ simultaneously and in phased relationship with the polarity reversals of the magnetic field; a low-pass filter which cuts off signals of a frequency $f_s$; and a sensing device to which said element is connected via said filter.

2. A magnetoresistive transducer head with thermal noise suppression comprising: a generally planar thin film element having an easy axis of magnetization in a major plane of said element; a current source for producing a constant unidirectional measuring current, having means for connecting said source at least indirectly to said element; bias means which induce the measuring current to flow through said element at an angle of at least 35° and at most 55° with said easy axis of magnetization; means to produce a magnetic field having a direction which is parallel to said axis of magnetization; means for reversing the polarity of the magnetic field at a frequency $f_s$; and a sensing device, said element being connected through a means, which switches the polarity of the output signal of the element with a frequency $f_s$, and through a low-pass filter, which cuts off signals of frequency $f_s$, to said sensing device.

3. A magnetoresistive transducer head as claimed in claim 2 in which said element has a longitudinal axis and said easy axis of magnetization is parallel to said longitudinal axis of said element, said bias means comprises a number of parallel equipotential strips of electrically conductive material which are provided on a major surface of the magnetoresistive element at an angle of at least 35° and at most 55° with said longitudinal axis.

4. A magnetoresistive transducer head as claimed in claim 2, in which said element has a longitudinal easy axis of magnetization which is parallel to said longitudinal axis of said element, said bias means comprises a plurality of parallel equipotential strips of electrically conductive material which are provided on a major surface of the magnetoresistive element at an angle of at least 35° and at most 55° with said longitudinal axis.

* * * * *